UNITED STATES PATENT OFFICE.

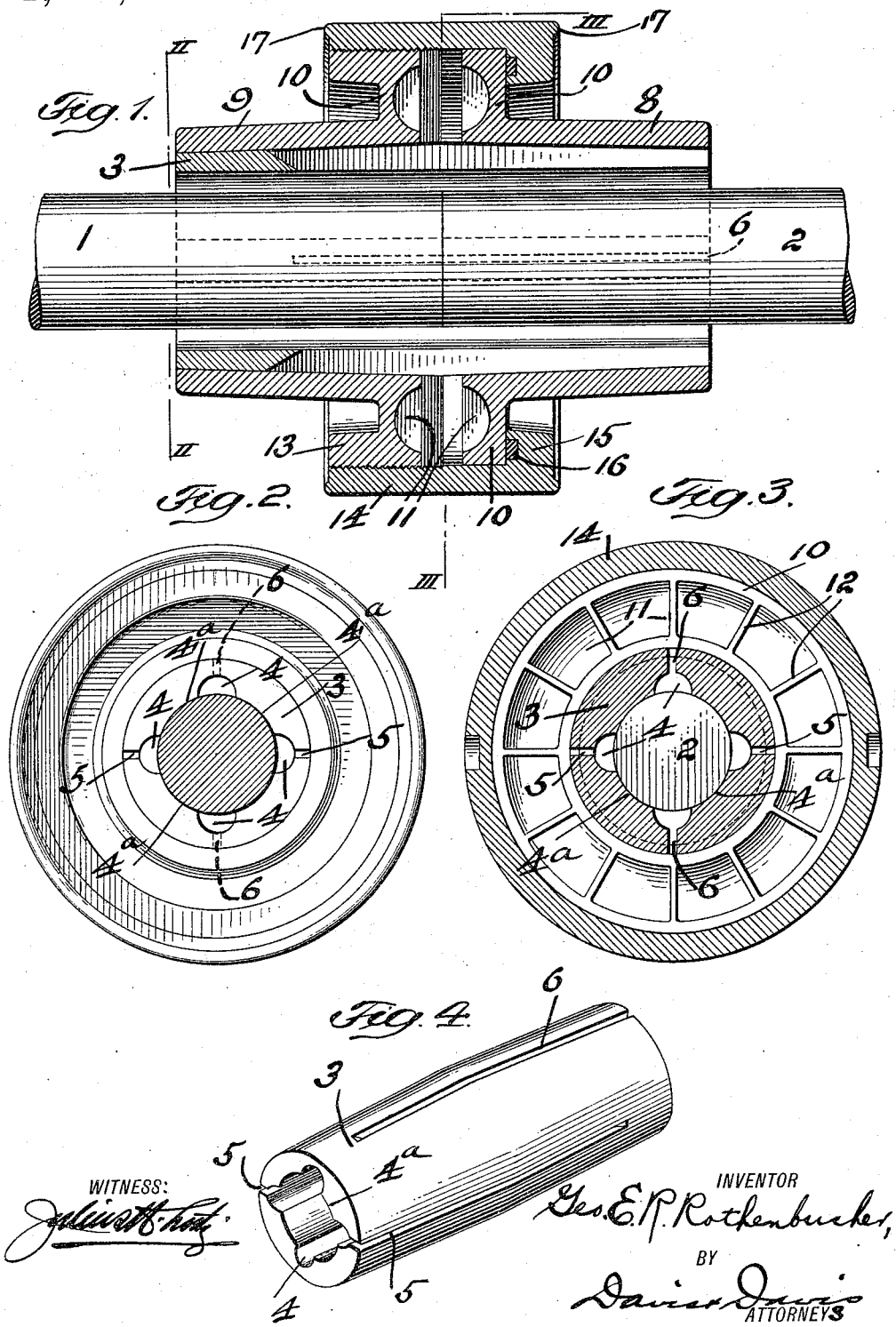

GEORGE E. R. ROTHENBUCHER, OF NEW YORK, N. Y., ASSIGNOR TO CORONUM EQUIPMENT COMPANY, INC., OF NEW YORK, N. Y., A CORPORATION OF NEW YORK.

COMPRESSION-COUPLING FOR SHAFTS.

1,184,025.  Specification of Letters Patent.  Patented May 23, 1916.

Application filed May 18, 1915. Serial No. 28,962.

*To all whom it may concern:*

Be it known that I, GEORGE E. R. ROTHENBUCHER, a citizen of the United States, and resident of the borough of Bronx, county of Bronx, city and State of New York, have invented certain new and useful Improvements in Compression-Couplings for Shafts, of which the following is a specification.

The main object of this invention is to provide a compression coupling for shafts formed of a few simple parts adapted to be assembled about the abutting ends of two shafts or two shaft sections and to be rigidly clamped thereto without the use of the ordinary bolts and nuts, so that when said coupling is assembled in position for use there are no projecting parts which are likely to in any way injure the operatives working about said shaft.

Another object of the invention is to provide a shaft coupling of the class described wherein the rotation of a single compression ring or sleeve will adjust the various parts of the coupling and clamp them rigidly to the shaft ends.

A further object of the invention is to provide a new and effective form of alining and clamping sleeve having a plurality of longitudinally extending gripping and clamping portions adapted to engage the surface of the shafts.

There are other important objects and advantages of the invention which will appear fully hereinafter.

In the drawings, Figure 1 is a longitudinal sectional view of a coupling applied to the abutting ends of two shafts, the shafts being shown in side elevation; Fig. 2, a transverse sectional view of the shaft taken on the line II—II of Fig. 1, showing one end of the coupling in elevation; Fig. 3, a transverse sectional view on the line III—III of Fig. 1; and Fig. 4 a detail perspective view of the clamping sleeve.

Referring to the various parts by numerals, 1 and 2 designate the abutting ends of two alined shafts or shaft sections. Engaging these shafts and bridging the joint between them is a clamping sleeve 3 which is of sufficient internal diameter to fit snugly over the shafts. Extending through the sleeve are four longitudinal grooves 4 located equal distances apart around the sleeve. These grooves form gripping portions 4ª which are separated from each other by the grooves 4 so that the internal surface of the sleeve is not continuous. The grooves 4 form pockets of considerable dimensions which extend entirely through the sleeve and are open at their ends. The clamping sleeve is slotted longitudinally from its ends inwardly for almost its entire length, slots 5 extending in from one end of the sleeve and slots 6 extending inwardly from the other end thereof so that said sleeve is comparatively flexible and may be readily compressed at both its ends. These slots are formed in the sleeve at the grooved portions thereof and extend entirely through the sleeve from the outer surface thereof to the grooves 4. The slots 6 are diametrically opposite each other, and the slots 5 are oppositely arranged and are diametrically opposite each other. Externally the clamping sleeve is tapered from a point midway its ends to each of its ends so that said sleeve is doubly tapered. Snugly fitting the tapered portions of the clamping sleeve 3 are two sliding compression sleeves 8 and 9, said sleeves being adapted to slide inwardly on said tapered surfaces, as will be fully hereinafter set forth. Each compression sleeve at its inner end is formed with an outwardly extending annular flange 10, each of said flanges being formed in their inner faces with annular concave channels 11 and bridging these channels at regularly spaced intervals are radial strengthening ribs 12, said ribs making the flanges 10 rigid and enabling them to resist the inward thrust brought on them by the clamping ring or sleeve, as will be hereinafter described. The compression sleeve 9 is provided with an annular, externally threaded flange 13.

In order to draw the two compression sleeves toward each other and inwardly on the tapered clamping sleeve 3, I provide an internally threaded clamping ring 14 which engages the threads of the flange 13. This clamping ring is formed with an inwardly extending annular flange 15 which is adapted to engage the outer surface of the flange 10 of the compression sleeve 8. It is manifest that by screwing the clamping sleeve into engagement with the threaded flange 13 of the sleeve 9 until the inwardly extending flange 15 of the clamping ring engages the flange 10 of sleeve 8, and then continuing the rotation of the clamping sleeve, the two compression sleeves will be drawn inwardly or toward each other and the sleeve 3 will be forced into close engagement with the shafts. To reduce the friction of the flange 15 on the outer face of its engaged flange 10 a non-friction washer 16 is carried by the flange 15 and is adapted to bear against the flange 10.

In order to rotate the clamping ring it is provided at diametrically opposite points with recesses to receive the ends of a suitable spanner, or other tool. The clamping ring is provided at each of its ends with the annular ribs 17 which extend outwardly beyond the end surfaces thereof. The object of these ribs is to prevent a belt or other similar device sliding into the annular recesses formed by the flanges 15 and 13, said ribs guarding said recesses and holding the belt out of engagement with the said flanges.

The gripping portions $4^a$ bind on the shaft and by reason of the grooves and slots in the sleeve said sleeve is capable of a slight twisting or distortion when an unequal strain is brought on the connected shaft couplings. This tendency to twist or distort the sleeve causes it to more securely hold the connected shaft ends in alinement and to prevent the slipping of one or both of said shaft sections in the coupling. The pockets formed by the grooves 4 are adapted to receive and hold any hard substance which might be on the shaft when the coupling is put together. In applying couplings of this character it is extremely difficult to have the shaft ends absolutely free of metal particles and other grit, the presence of which will cause the shafts to slip in the coupling when placed under a torsional strain. With a clamping sleeve constructed as shown and described any particles which might be on the shaft under any one of the gripping edges will work their way into one of the pockets and be retained therein. This will insure a clean contact between the gripping keys and the shaft.

It is manifest that I provide a compression coupling formed of very few parts, and which may be very readily assembled. It is also manifest that the clamping sleeve may be forced into contact with the shafts under a very great pressure. It is also evident that when my coupling is in position for use there are no projecting parts and no possibility of an operative being injured by said coupling. There are no bolts or nuts used and there are no projecting parts likely to become entangled in the clothing of an operative. This is a very important feature of my invention.

What I claim is:

A compression coupling for shafts comprising a double tapered clamping sleeve formed with a plurality of internal broad grooves extending longitudinally thereof, said grooves forming gripping edges which extend entirely through the sleeve, said sleeve being also slotted from each end inwardly for a substantial portion of its length and splitting the sleeve radially at the points where the grooves are formed, some of said slots extending inwardly from one end of the sleeve and others extending inwardly from the other end of the sleeve, a compression sleeve on each end of the clamping sleeve, and means to draw said compression sleeves toward each other and thereby contract the clamping sleeve.

In testimony whereof I hereunto affix my signature in the presence of two witnesses.

GEO. E. R. ROTHENBUCHER.

Witnesses:
F. R. MILLER.
MINERVA VAN ALEN.

Copies of this patent may be obtained for five cents each, by addressing the "Commissioner of Patents, Washington, D. C."